Figure 2:
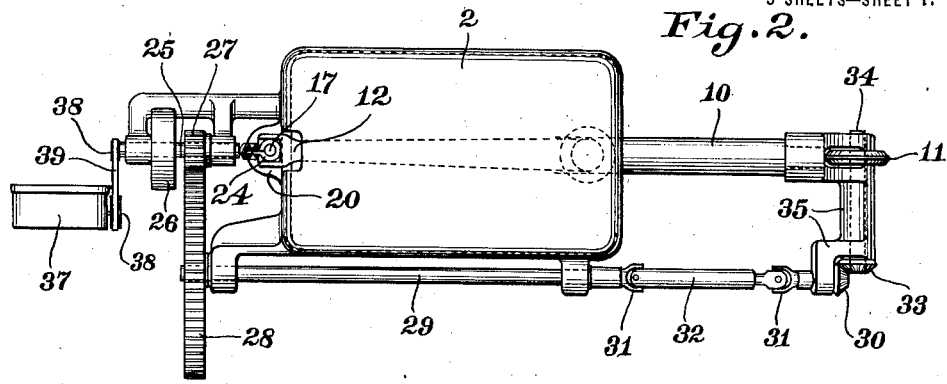

R. C. PIERCE AND N. MACNEALE.
ELECTRIC WELDING.
APPLICATION FILED APR. 26, 1915.

1,315,239.

Patented Sept. 9, 1919.
3 SHEETS—SHEET 1.

R. C. PIERCE AND N. MACNEALE.
ELECTRIC WELDING.
APPLICATION FILED APR. 26, 1915.

1,315,239.

Patented Sept. 9, 1919.
3 SHEETS—SHEET 2.

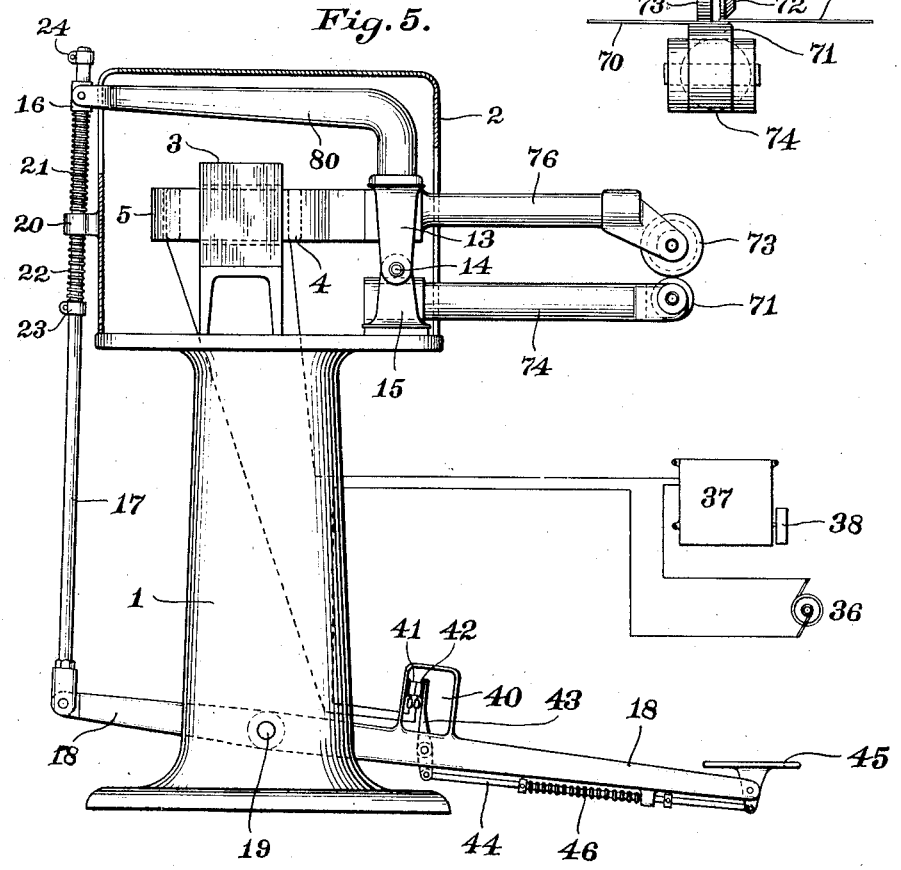

UNITED STATES PATENT OFFICE.

ROBERT C. PIERCE AND NEIL MACNEALE, OF CINCINNATI, OHIO, ASSIGNORS, BY MESNE ASSIGNMENTS, TO THOMSON ELECTRIC WELDING COMPANY, OF LYNN, MASSACHUSETTS, A CORPORATION OF MASSACHUSETTS.

ELECTRIC WELDING.

1,315,239.    Specification of Letters Patent.    Patented Sept. 9, 1919.

Application filed April 26, 1915. Serial No. 23,798.

*To all whom it may concern:*

Be it known that we, ROBERT C. PIERCE and NEIL MACNEALE, citizens of the United States, residing at Cincinnati, in the county of Hamilton and State of Ohio, have invented certain new and useful Improvements in Electric Welding, of which the following is a full, clear, and exact specification.

Our invention relates to an improved method of electric welding and to an improvement in electric welding apparatus, particularly adapted for practising the improved method of welding.

Our invention is especially applicable to seam welding sheets of metal together. According to one prior method, the edges of two sheets of metal may be electrically welded together by overlapping the sheets and applying electrodes supplying the welding current to opposite sides of the sheets at a point where they overlap. After applying a suitable pressure and quantity of current the electrodes may then be separated and the work moved a short distance and then the electrodes again applied to form another weld between them. The process may then be successively repeated many times along the overlapped edges of the sheets to be welded. But such a method necessarily limits the rapidity with which the welding may be accomplished by reason of the fact that a complete cycle of movements of the electrodes and of the work is required in making each successive weld. Moreover, the quality of the work is largely dependent upon the skill of the operator, the operator being likely to unevenly space the successive welds and not properly merge them and to also vary the weld from accurate alinement. Again, a considerable amount of overlap of the sheets is necessary for making the weld by such process and even when great care is taken, the resultant surfaces are quite irregular and rough.

Another method of accomplishing a seam weld by electrodes in contact with the work is to use roller electrodes which apply pressure to the work and also conduct current through the work without interruption as the work to be welded is passed between the rollers. Although this method may be practised with more speed than with the intermittent application of the electrodes, yet the speed cannot exceed that which will enable sufficient heat to be created for making a satisfactory weld. In accomplishing this the heat necessarily extends over a considerable portion of the sheets which adjoin the surfaces actually welded, causing a heating of the work considerably beyond the welded surfaces. This results in distortion of the sheets by irregular expansion due to excessive heating which makes it somewhat difficult to make the seam even and properly welded throughout its length.

In our improved method and apparatus therefore, the electrodes on opposite sides of the seam to be welded, exert a continuous pressure upon the work throughout the length of the seam while the work is passed between the electrodes. The current supplied may be alternating current of the usual frequency employed in the welding art, that is, a frequency of say 25 cycles per second. By this invention when an alternating current is employed, it is interrupted or impeded periodically so as to give a succession of effective wave-trains of current. This gives rapid successive applications of alternating current to the work while the electrodes are continuously applied to the work. By this method, the welding of a seam may be very rapidly accomplished; the weld is regular and uniform and quite independent of the skill of the operator. Also the amount of the overlap of the sheets need be comparatively small and the finished product at the seam need not be much thicker or heavier than the thickness of one of the sheets. Furthermore, the heating is confined very largely to the welded portions so that heating of the sheets considerably beyond the seam is avoided. Also the sheets are not materially distorted or warped by excessive expansion and consequently the sheets may be evenly welded over long lengths of welds. These and other advantages of our invention will be understood from the following description and accompanying drawings.

Figure 1:
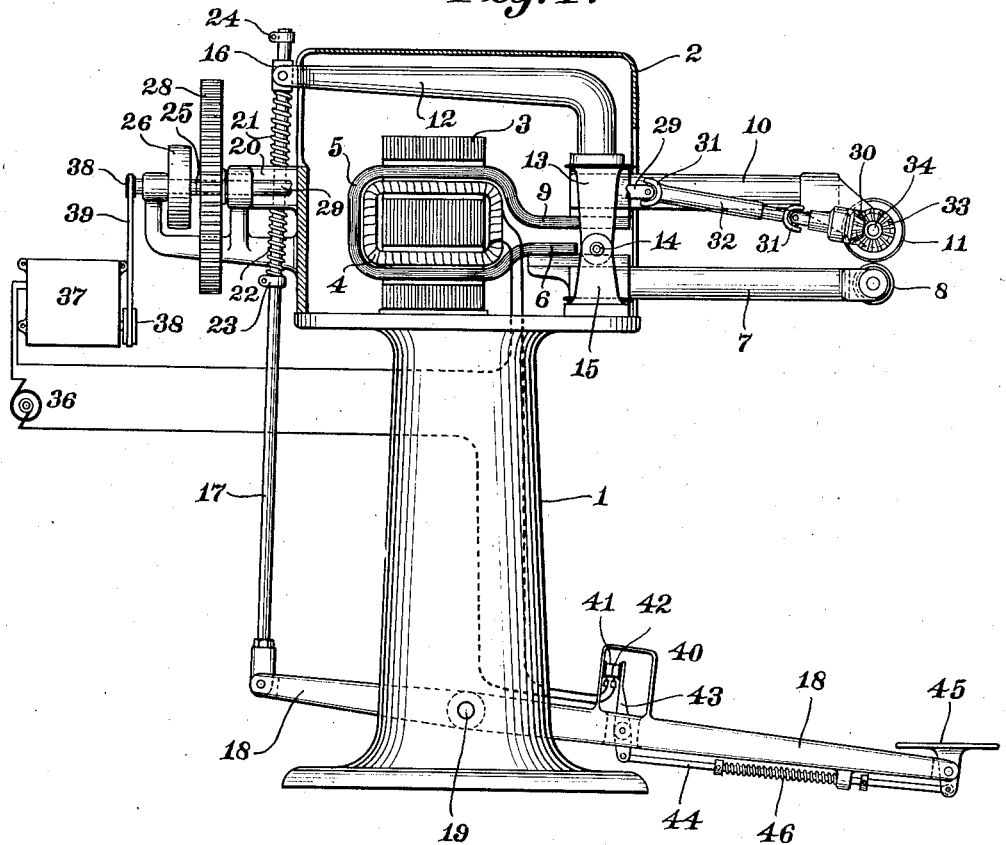
Figure 3:
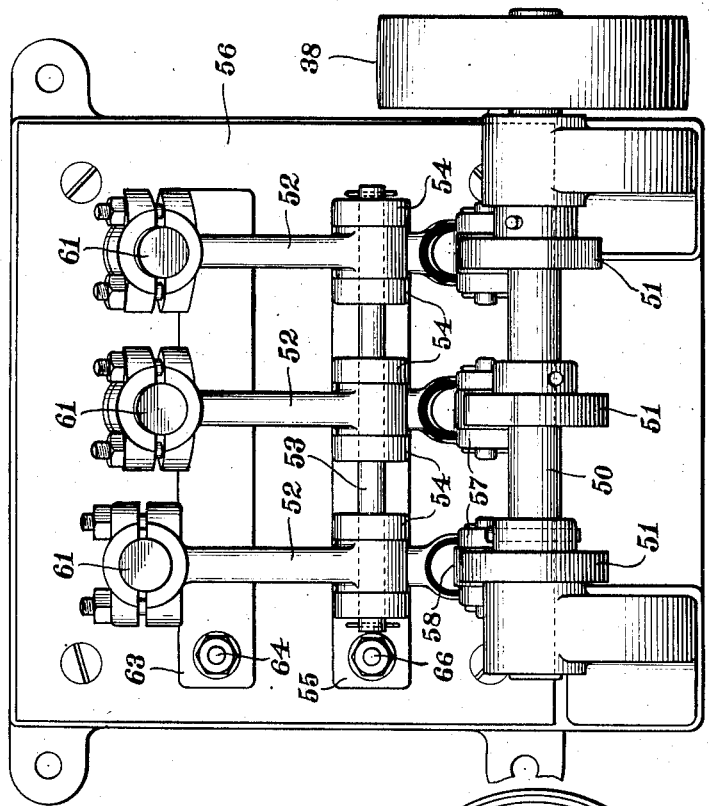

Figure 1 is a side elevation of a machine partly in section constituting one embodiment of our invention and which machine may be utilized in practising our improved method. Fig. 2 is a plan view thereof. Fig. 3 is a front elevation of means for controlling the supply of current. Fig.

4 is a side elevation thereof. Fig. 5 is a side elevation partly in section of a modified form of construction. Fig. 6 is a plan view thereof partly in section, and Fig. 7 is an end view of the rollers and their supports in this modified construction.

Referring to Figs. 1 and 2, the welding machine is shown as having a support 1 and a casing 2 at its upper end. Within the casing is indicated the core 3 of a transformer having a primary winding 4 and a secondary 5, the latter consisting of a single turn. The lower lead 6 from the transformer secondary is electrically connected to an arm 7 which carries a roller 8 at its outer end, which roller serves as one electrode of the machine. The arm 7 is suitably insulated from other parts of the machine.

The other secondary lead 9 is electrically connected to the underside of an arm 10 which carries a roller 11 at its outer end, the roller 11 forming the other electrode of the machine. The rollers 8 and 11 are of course in good electric contact with the arms 7 and 10 respectively, any suitable auxiliary means for securing good electric contact with the rollers being used as may be necessary. An arm 12 extends along the upper part of the casing 2 and at its right-hand end has a depending portion and side extensions 13 which are journaled at 14 in pedestals 15. The inner end of the arm 10 is located between the side pieces 13 and is mechanically supported upon the pivoted arm 12 between the side extensions 13, being insulated from the arm 12. It is obvious that when the left-hand end of the lever or arm 12 is raised or lowered, the roller electrode 11 will be correspondingly lowered or raised, for receiving the work between the electrodes.

The outer end of arm 12 is pivotally connected to a block 16 which latter is slidable upon the rod 17, the lower end of which is pivotally connected to an end of a foot lever 18, which latter is pivoted in the base of the machine at 19. The rod 17 passes freely through a lug 20 extending from casing 2. At opposite sides of this lug are a pair of springs 21, 22, which surround the rod 17. The upper end of spring 21 bears against the block 16 and consequently exerts a continuous pressure upon the lever 12 tending to hold the roller electrode 11 against the roller 8, or against any work to be operated on when inserted between the electrodes. The lower end of the spring 22 engages an adjustable clamp 23 on the rod 17 and consequently exerts a pressure tending to force the rod 17 downwardly and to raise the operator's end of the lever 18. At the upper end of the rod 17 is another adjustable clamp 24 adapted to engage the block 16 and thereby separate the electrodes of the machine from each other when the rod 17 is depressed. The tension of the springs 21, 22 may be adjusted relatively to each other as desired and the force exerted by spring 22 will preferably be adjusted so as to exert greater force than that of spring 21 and consequently cause the tappet or clamp 24 to be forced downwardly against the block 16, and cause the electrode 11 to be raised from the electrode 8 or from any work between them. Spring 22 will also cause the operator's end of the lever 18 to be raised. When the lever 18 is depressed by the operator, the force exerted by spring 22 is overcome and the tappet 24 raised which will permit the spring 21 to cause the lever 12 to be thrown so as to bring the electrode 11 against the work located between the electrodes. The tension of spring 21 will be made adjustable in any well known manner.

The shaft 25 is supported by the frame, which shaft may be driven from any suitable source of power as by the pulley 26. Fixed to the shaft is a gear 27 meshing with a gear 28, which in turn is fixed to a shaft 29 supported from the frame. This shaft drives a bevel gear 30 through universal couplings 31, and the telescoped shaft 32. The bevel gear 30 drives another bevel gear 33 fixed to the shaft 34 on which shaft the roller electrode 11 is also secured. The shaft 34 and shaft carrying bevel gear 30 are suitably supported in an extension 35 from the arm 10. Consequently when the arm 10 is raised or lowered to any position desired, the driving connection from the shaft 25 to the roller electrode 11 is always maintained.

A source of alternating current energy is indicated at 36 which supplies alternating current to the primary winding 4 of the transformer. In series with the supply circuit of the primary winding is connected the current interrupter indicated at 37, which is shown in this instance as being mechanically driven from the shaft 25 by pulleys 38 and belt 39. Any suitable source of power may, however, be used for operating the interrupter and the interrupter itself may be of any suitable form for rapidly interrupting the current supplied, or for rapidly varying the amount of electric energy supplied. In order to control the supply of current at the will of the operator, a switch 40 is connected in series with the transformer primary as shown. This switch is provided with a stationary contact 41 and a movable contact 42, the latter being mounted upon a pivoted arm 43. This switch-arm is connected by a rod 44 to the operator's foot lever 45. A spring 46 tends to hold this switch in open position, except when the operator exerts pressure upon the foot lever 45 to close the switch during the welding operation.

Figure 4:
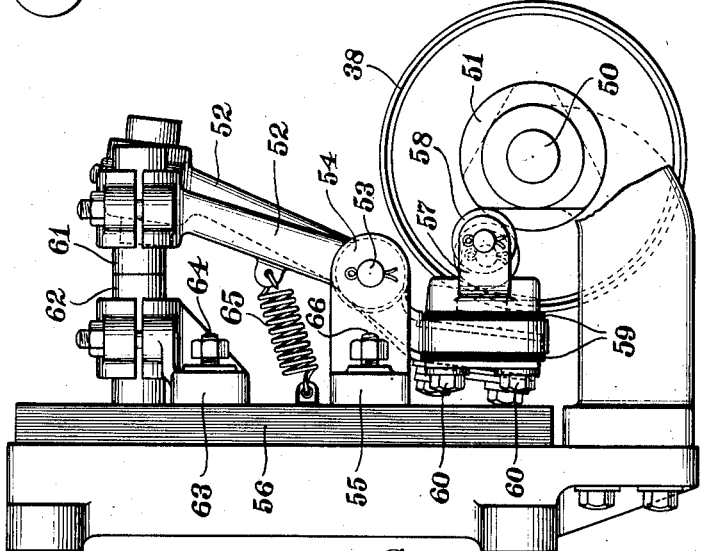

One form of current interrupter and the form indicated in Figs. 1 and 2 is more fully disclosed in Figs. 3 and 4 on an enlarged scale. The pulley 38 is shown driving a shaft 50 upon which are mounted three cams 51, each of which is the same shape, being circular with one flat side as shown in Fig. 4. Each of these cams is secured to the shaft 50 at an angular relation to each other of 120 degrees so that the successive flat portions of the cams are regularly spaced.

There are three movable switch-arms 52, corresponding respectively to the cams 51. These switch-arms are movably mounted upon a shaft 53 supported in bearing supports 54. These bearing supports extend from a base 55, mounted upon an insulating supporting panel 56. A terminal connection to the base 55 is shown in the form of a screw and bolt 66. Each of the switch-arms 52 is in electrical connection with the base 55. At the lower end of each switch-arm 52 is mounted a bearing support 57 for a roller 58, each roller 58 engaging its respective cam 51. Each bearing support 57 and roller 58 is insulated from its respective switch-arm in any suitable manner, such as by insulating strips 59, and insulating bushings around the bolts 60. The upper end of each switch-arm 52 is shown as having clamped thereto a contact 61 which in turn engages its corresponding fixed contact 62. The fixed contacts are supported from and in electrical connection with a conducting base strip 63 mounted upon the insulating panel 56. At 64 a bolt and nut is shown for making electrical connection with the supply circuit. The contacts 61, 62 may be of carbon or other suitable form of contact and in some instances the contacts may have primary and secondary breaking contacts for minimizing sparking, or may have other suitable arrangements or auxiliary devices for this purpose. Each switch-arm 52 has connected thereto a spring 65 which is also connected to the supporting panel. These springs exert a tendency to hold the switch closed and to force the rollers 58 against their respective cams 51.

It is obvious that when the pulley 38 is rotated to cause rotation of the cams 51, each cam will force its roller 58 inwardly and cause the switch-arm 52 to be thrown outwardly, breaking the electrical connection between its respective contacts 61 and 62 once during each complete revolution of its corresponding cam 51. As the switches are all connected in parallel with each other between the terminals 56 and 64, the circuit through this device is completely interrupted only when all three switch-arms are simultaneously moved outwardly a certain amount so that no connection exists between any of the contacts 61 and 62. By reason of the angular relationship of the cams 51 to each other, and to their respective rollers 58, only one switch-arm is in closed position at a time, the other two switch-arms being in open position, and the main circuit is interrupted by each of the three switch-arms once per each revolution of the shaft 50 giving with the particular form of construction shown, three interruptions of the main circuit per each revolution of the shaft 50.

We have found that 400 interruptions per minute of the primary current supplied by a device of this character gives very satisfactory results with comparatively thin sheets of metal. This number of interruptions of current per minute is equivalent to about six or seven interruptions per second. Inasmuch as the alternating current employed is of a frequency such as is common in this art, say 25 cycles per second, it follows that an interruption of the alternating current occurs once for about seven or eight half waves of electromotive force impressed by the source 36 on the circuit terminals connected thereto. Hence the current through the primary winding 4 and through the electrodes in circuit therewith consists of a succession of trains of waves separated by intervals of no current whatever, such that in the particular instance now supposed there will be somewhat less than seven half waves in each such train. The number of interruptions may of course be varied to suit the nature of the stock operated upon as well as the capacity of the machine and size of the electrodes. It will also be understood that instead of opening and closing the supply circuit for giving intermittent applications of electric current through the work between the electrodes, the supply current may be caused to give pulsations of energy between maximum and minimum amounts. In some cases the pulsations may be obtained by periodically varying a considerable resistance inserted in the supply circuit. It will also be understood that any suitable form of current interrupter or controller may be used other than the particular form shown in Figs. 3 and 4. For example a rotating commutating device may be used, instead of the reciprocating switch or switches.

In operation the pieces of stock to be welded are placed in the relation to each other as desired, such as with their edges overlapped in case a seam weld at the edges of the stock is to be made. The stock is then placed on the lower electrode 8 at the point where the welding is to commence and the operator then depresses the operating lever 18 which causes the roller electrode 11 to come in contact with the top surface of the work. The operator also cants the lever 45 so as to close the switch 40. The pulley 26 being driven from any suitable source of power causes the driving of the roller electrode 11 as above explained, and the feeding of the work between the electrodes. The interrupter 37 also being mechanically driven as above described, causes the primary current supply to be very rapidly interrupted giving rapid pulsations of welding current through the work between the electrodes without any interruption of the surface contact between the work and the electrodes and without any change in the mechanical pressure exerted upon the work by the electrodes, and also without any opening or closing of the welding circuit whatever. When the length of the seam to be welded has been traversed, the operator releases the foot lever and the switch 40 is opened and the electrode 11 raised from the work. The process is repeated in the same way with other work to be operated upon.

In the form of construction shown in Figs. 5, 6 and 7, the support on the underside of the sheets 70, 70' to be welded does not conduct any of the welding current, but two electrodes are used above the sheets by which current is passed into and out of the work. In the particular form of construction shown, the lower support for the work is shown as a roller 71. One of the electrodes above the work is shown as a beveled roller 72 having its contacting surface over the over-lapping portions of the sheets 70, 70'. The other electrode is shown as a roller 73 above the sheet 70 and contacting therewith. Current is caused to pass to and from the work by means of the electrodes 72, 73 and is thereby necessarily caused to pass through the sheets where they overlap. The supporting roller 71 is, like the other rollers, preferably of copper. The lower roller is supported by the supporting arm 74, which is fixed to the frame of the machine. The roller electrodes 72, 73 are respectively journaled in the ends of two arms 75, 76. The arm 75 is electrically connected with one lead 77 of the secondary 5 of the welding transformer and the arm 76 is similarly electrically connected with the other lead 78 of the transformer secondary. These parts are respectively supported by two pivoted arms 79 and 80. Each of these arms is similar to the arm 12 already described in connection with Figs. 1 and 2 and has a similar depending portion with side extensions 13 which are journaled at 14 in pedestals 15. The inner ends of the arms 75 and 76 and the leads 77 and 78 are insulated from the arms 79 and 80. The rear ends of the arms 79 and 80 are connected respectively to blocks 16, as in the construction of Figs. 1 and 2; and the mechanism for operating these arms is similar to that already described, the same reference characters being applied to designate corresponding parts.

An interrupter 37 which may be of the form already described is connected in series with the primary 4 of the welding transformer. This interrupter may be driven by the pulley 38 or any other suitable driving means as already described.

The operation of this modified constrution is similar to that already described. The two roller electrodes 72 and 73 are simultaneously raised by the force of the two springs 22 on each of the rods 17, the two tappets 24 engaging the blocks 16 and thereby causing the electrodes 72, 73 to be raised. When the lever 18 is depressed by the operator the two rods 17 are simultaneously raised and the electrodes 72, 73 are permitted to come in contact with the work as shown in Fig. 7 or as may be otherwise desired. As the work is forced between the electrodes, the welding energy is supplied in pulsations as already described with the advantageous results already referred to, the electrodes being continually maintained in contact with the work. As already stated the current passes through the work directly between the electrodes 72, 73. When the seam is completed, the electrodes 72, 73 are simultaneously raised from the work and the work will then be readily removed. In this particular form shown, the rollers are not driven by mechanical power, the operator in this case forcing the work between the rollers. It is, however, evident that if desired, one or more of the rollers may be mechanically driven, as in the construction of Figs. 1 and 2.

It will be understood that although the machines as above described illustrate certain forms of machines for practising the method disclosed, many different forms of construction may be utilized to suit the requirements of the particular work operated upon and the nature of weld desired. In some instances for example, instead of using roller electrodes, the electrodes may be non-rotatable and maintained in contact with the work while the latter is pushed or forced between them with a continuous motion by the operator or by suitable mechanism. With the form of construction as above described the welded seam is a continuous weld and is water tight, but it is obvious that the supply of energy may, if desired, be interrupted much less rapidly and produce a series of separate welds spaced apart from each other along the overlapped portions of the work, the electrodes, however, being maintained in continuous contact with the work for producing a series of such welds.

In referring to the electric current as it is employed in our invention as "intermittent", it will be perceived that this term does not have reference to the ordinary alternations of the current supply. The alternating current reverses its direction of flow many times per second, but there is no appreciable period of null current between these reversals. In the particular exemplification of our invention disclosed in the foregoing specification, such alternating current is periodically interrupted and we refer to such an interrupted current as an intermittent current.

Having thus described our invention, what we declare as new and desire to secure by Letters Patent of the United States is:—

1. In an electric welding machine having a rotatable electrode, the combination with a supporting pedestal of brackets carried thereby, a pulley journaled in said brackets, means at one side of said pulley for driving said electrode, and means at the other side of said pulley intermittently interrupting the current through said electrode.

2. In an electric welding machine having a rotatable electrode, the combination with a transformer casing of brackets carried thereby, a driving pulley and horizontal shaft carried by said brackets, a shiftable support for said rotatable electrode, and a flexible extension driving said electrode from said shaft.

3. In an electric welding machine having a rotatable electrode, the combination with a transformer casing, of bearing brackets on the rear thereof for a driving pulley, a driving pulley, and means for transmitting power from said pulley to said rotatable electrode.

4. In an electric welding machine, the combination of electrodes adapted to be applied to the work, means for supplying an intermittent current to the welding circuit while the electrodes are maintained in contact with the work, said means comprising a plurality of successively operated switches.

5. In an electric welding machine, the combination of electrodes adapted to be applied to the work, means for supplying a pulsating current to the welding circuit while the electrodes are maintained in contact with the work, said means comprising a plurality of switches connected in parallel and means for successively opening and closing said switches.

6. In an electric welding machine, the combination of electrodes adapted to be applied to the work, means for supplying a pulsating current to the welding circuit while the electrodes are maintained in contact with the work, said means comprising a plurality of switches connected in parallel and a plurality of cams coöperating with said switches respectively for successively opening said switches.

7. In an electric welding machine, two opposed rollers adapted to receive a pair of overlapping metal sheets between them, means to press said rollers together, a transformer having one of said rollers included as an electrode in its secondary circuit, an alternating current source connected to its primary, and means periodically to interrupt the flow of current in said primary.

8. In an electric welding machine, a frame, a pair of arms projecting therefrom, rollers at the ends of said arms adapted to receive work to be welded between them, one of said arms being pivoted on said frame, means to press said pivoted arm against the other arm and means to supply an intermittent alternating current to the work through one of said rollers as an electrode.

In testimony whereof we affix our signatures in presence of two witnesses.

ROBERT C. PIERCE.
NEIL MACNEALE.

Witnesses:
FRANK WARREN,
A. M. WALSH.